July 25, 1967 F. Q. SAUNDERS 3,332,477
WATER HEATING APPARATUS
Filed Jan. 5, 1965 4 Sheets-Sheet 1
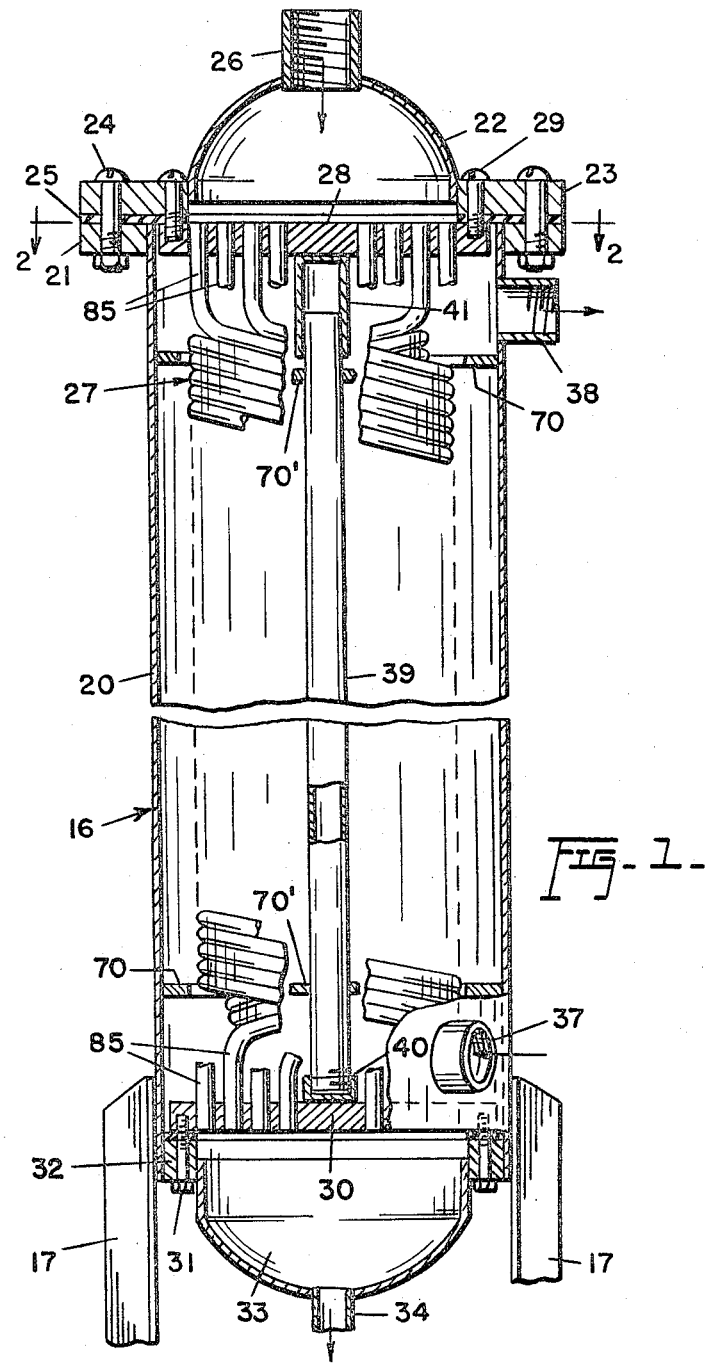
INVENTOR
FRED Q. SAUNDERS
BY *Munson H. Lane*
ATTORNEY

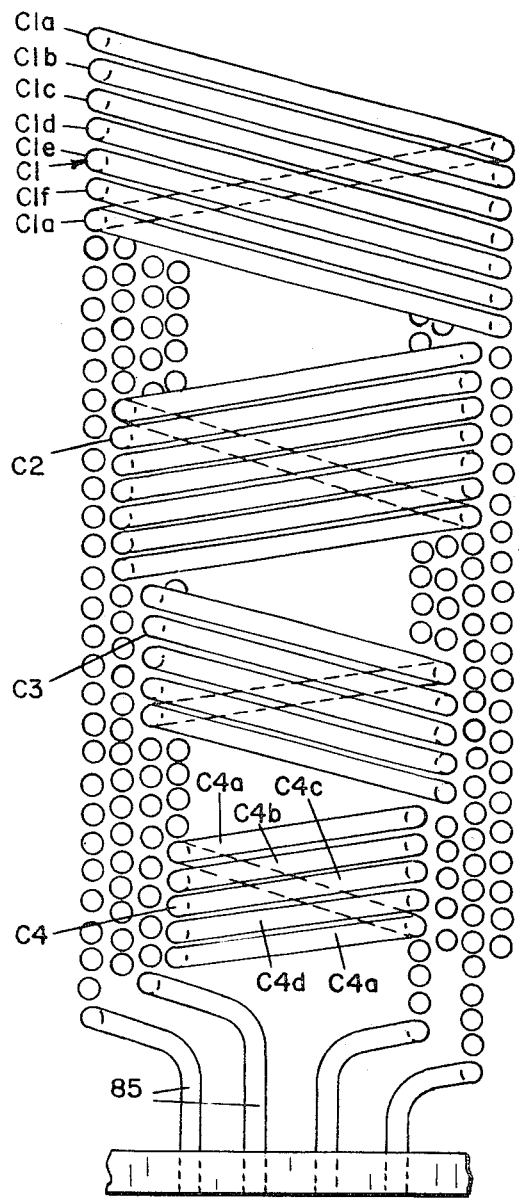
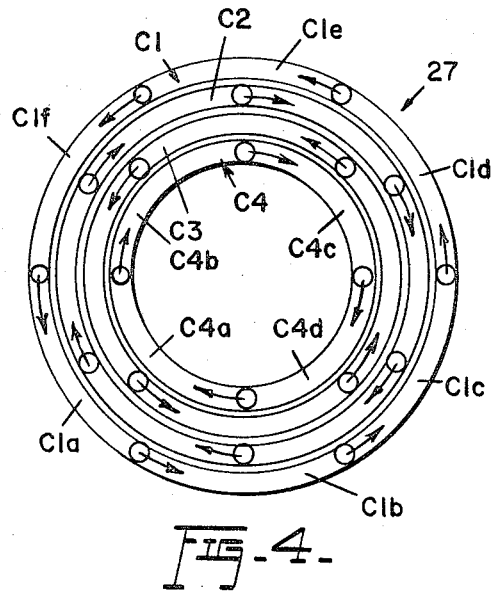
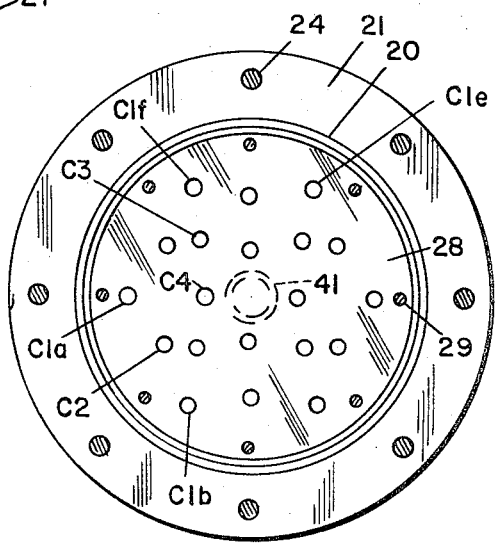

July 25, 1967  F. Q. SAUNDERS  3,332,477
WATER HEATING APPARATUS
Filed Jan. 5, 1965  4 Sheets-Sheet 3

INVENTOR
FRED Q. SAUNDERS
BY Munson H. Lane
ATTORNEY

INVENTOR

FRED Q. SAUNDERS

BY Munson H. Lane

ATTORNEY

United States Patent Office 3,332,477
Patented July 25, 1967

3,332,477
WATER HEATING APPARATUS
Fred Q. Saunders, Richmond, Va., assignor to Richmond Engineering Company, Incorporated, Richmond, Va.
Filed Jan. 5, 1965, Ser. No. 423,517
13 Claims. (Cl. 165—76)

ABSTRACT OF THE DISCLOSURE

The principal object of the invention is to provide a heavy duty, highly efficient water heating apparatus comprising a heat exchanger of a novel construction, wherein the heat exchanger tank or casing contains a coil assembly consisting of pairs of coil units nested together in concentric relation, and wherein means are provided for removably and independently mounting the pairs of coil units in the tank so that each pair of coil units may be removed from the tank without disturbing the others.

This invention relates to new and useful improvements in water heating apparatus, and in particular the invention concerns itself with commercial or industrial water heaters using steam or high temperature water as a source of heat.

The heat exchanger coils are so arranged as to occupy a minimum of space to provide the exposed heating surface desired, which in turn substantially reduces the space required to house the water heating unit.

Coils are so arranged as to enable removal of accumulated scale by rapidly changing temperature of coils. Temperature change is accomplished by allowing water to flow through the tank and at the same time cutting off and turning on steam or high temperature water flowing through the coils. This will result in substantial and rapid change in temperature of coils, thus causing shock type expansion and contraction of the coils. Due to the formation of the coils and the way in which they are anchored at both ends, the expansion and contraction creates a rapid change in radius of the coils, thus dislodging scale which might accumulate on the surface, both interior and exterior. The scale may be flushed out with the water or condensate from both surfaces of the tubes. This procedure will cause no strain on the coils since alternate coils are turned in opposite directions, thus compensating for torque created by expansion and contraction.

Steam pressure is maintained in the coils, the maximum being approximately 15 pounds per square inch less than the minimum water pressure maintained in the tank. This feature eliminates the necessity of a control valve for the steam supply where the source of steam is at a pressure less than the allowable maximum. In case of hot water being used as a heating medium, the heating water must be at a temperature of at least 15 degrees F. below the saturation temperature of water at a minimum pressure of the water carried in the tank. Heating hot water may be continuously circulated through the tubes, thus eliminating a flow control valve and at the same time preventing the unbalancing of the high temperature-hot water system often caused by major changes in flow in any part of the system. The fact that each tube in the coils is exactly the same length further assure uniform flow of heating water through the coils which in turn produces maximum overall heat transfer.

Arrangement of coils within the tank coupled with the single pass flow through the heater offers a minimum of resistance to flow of fluid being heated through the tank. Single passage of the heating fluid through equal length tubes also assures uniform flow of the fluid through all coils at a minimum of pressure drop.

Temperature of water stored on the heat exchanger is not critical respecting controlled end temperature of the water leaving the unit except that it be at least as high as the end temperature. This advantage eliminates the concern of stratification of heated water in a tank storing hot water over a long period of time, particularly where there is little flow involved; heated water stored in a tank tends to stratify, the hotter water being at the top and the temperature reducing substantially below the top level. Control of water temperature leaving the unit takes place at the outlet of the unit by mixing hotter and cooler water than the desired end water temperature thus assuring more accurate control of the end temperature. Where it is attempted to store water at the end controlled temperature, it is difficult to obtain a constant temperature of water leaving one outlet of the tank due to stratification of relative large volumes of heated water in the tank.

Other advantages of the invention reside in its simplicity of construction, in its durability, in its adaptability to convenient maintenance, and in its adaptability to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a vertical sectional view of the heat exchanger;

FIGURE 2 is a horizontal sectional view, taken substantially in the plane of the line 2—2 in FIGURE 1;

FIGURE 3 is a diagrammatic view showing the arrangement of the heat exchanger coils;

FIGURE 4 is a diagrammatic view of the coil connections;

Figure 5:
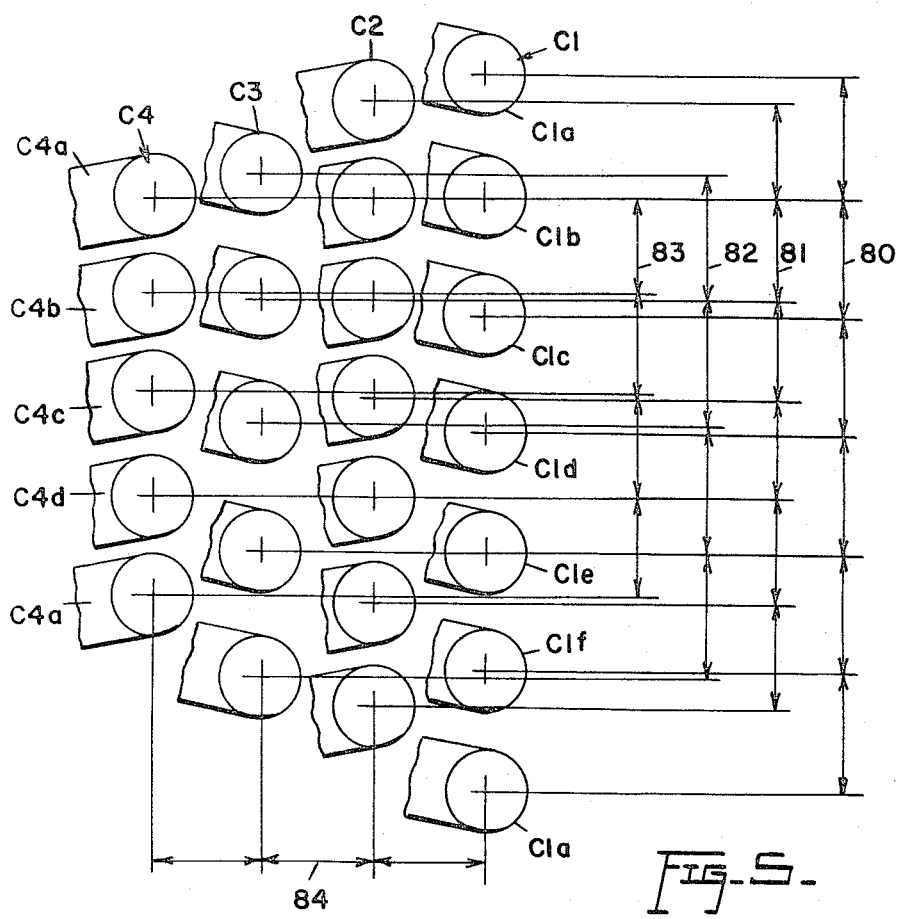
FIGURE 5 is an enlarged diagrammatic view showing the coil spacing.
Figure 6:
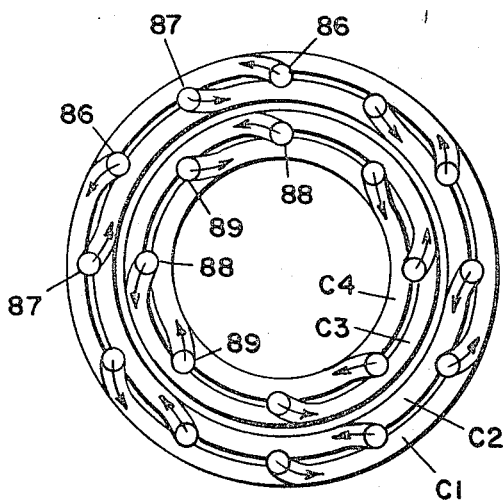
FIGURE 6 is a diagrammatic view of a modified arrangement of coil connections.
Figure 7:
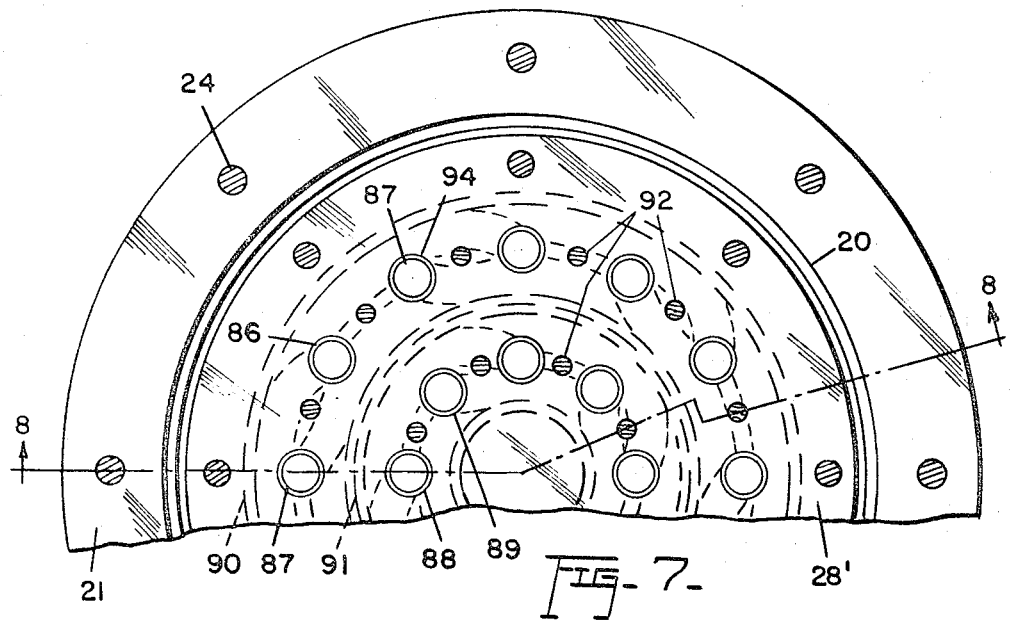
FIGURE 7 is an enlarged, fragmentary horizontal sectional view of a heat exchanger using the coil connections of FIGURE 6, this view being taken substantially in the plane of the line 7—7 in FIGURE 9.
Figure 8:
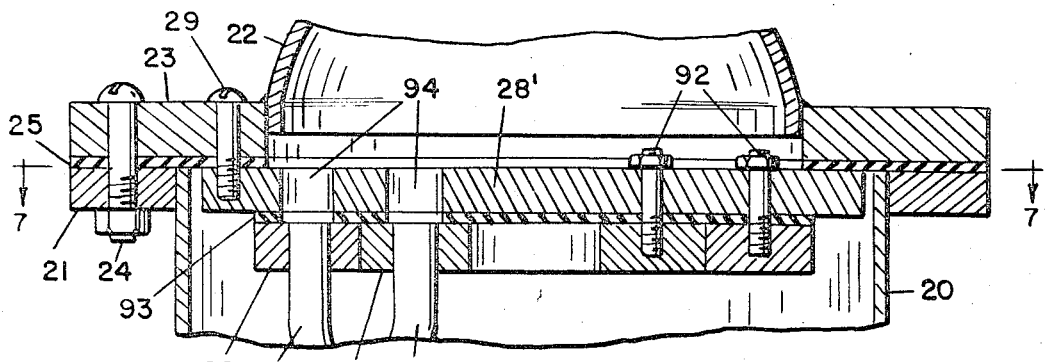
FIGURE 8 is a fragmentary vertical sectional detail, taken substantially in the plane of the line 8—8 in FIGURE 7.
Figure 9:
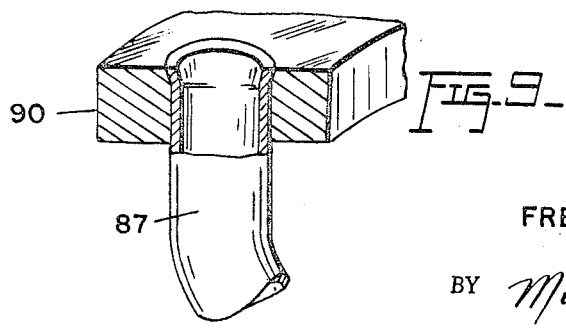
FIGURE 9 is a fragmentary perspective view of one of the coil ends and rings.

Referring now to the accompanying drawings in detail, the heat exchanger tank 16 has a cylindrical side wall or shell 20, to the upper end of which is secured an external ring or flange 21. A dome-shaped steam header 22, provided with an external mounting ring 23 is provided at the top of the tank and is removably secured to the ring 21 by a plurality of bolts 24, a suitable gasket 25 being interposed between the rings 21, 23, as will be apparent. The header 22 is provided at the top thereof with an inlet connection 26 through which steam or hot water may be admitted into the header for heating the water in the tank. For purposes of this description steam may be regarded as the source of heat, although hot water may be employed if so preferred.

A heat exchange coil assembly 27 is provided inside the jacket or shell 20, the arrangement thereof being hereinafter detailed. For the time being it may be mentioned that the assembly 27 consists of a group of coils or coiled tubes, the upper ends of which are open and secured in a circular plate or tube sheet 28 which is disposed immediately below the steam header 22 and is removably secured by suitable bolts 29 to the underside of the header ring 23. Similarly, the lower ends of the heat exchanger tubes are open and secured in a circular plate or tube sheet 30, the latter being disposed in the lower portion of the tank and removably secured by suitable bolts 31 to an internal mounting ring 32 provided at the lower end of the tank. The ring 32 also carries a condensate header 33 having a drain 34. It will be apparent that steam entering the steam header 22 through the inlet 26 will pass into the upper ends of the heat exchange tubes 27 and out of the lower ends of the tubes into the condensate header 33. Cold water to be heated is admitted into the shell 20 of the tank through an inlet connection 37 near the bottom of the tank, so that the water surrounds the heat exchange coil assembly 27 and becomes heated by the steam flowing through the coil assembly. The heated water leaves the tank through an outlet connection 38 near the top of the tank, as will be apparent.

Baffles 70 are provided between the outside of coil assembly 27 and the inside surface of tank 20, one above inlet 37 and a second below outlet 38. Baffles 70' on inside coil assembly 27 on the same level as the outside baffles and suspended from 39. The purpose of these baffles is to force the water flowing through the heater from the inlet 37 to the outlet 38 to pass between the coils instead of shortcurrenting the coils.

Referring again to the tank structure, a central tubular supporting post 39 extends between the tube sheets 28, 30, the lower end of the post being screw-threaded into a socket 40 affixed to the top of the sheet 30, while the upper end portion of the post is slidably telescoped into a similar socket 41 affixed to the underside of the sheet 28. It will be apparent that for purposes of maintenance or replacement, the entire coil assembly 27 may be readily removed from the tank by simply removing the bolts 24, 29, 31 and withdrawing the coil assembly with the tube sheets 28, 30 bodily from the tank.

Referring now in detail to the aforementioned heat exchange coil assembly 27 and with particular reference to FIGS. 3–5, it will be noted that the coil assembly consists of a plurality of concentrically disposed coil units, as for example, the coil units C1, C2, C3, C4, which are nested within each other, the unit C1 being of the largest diameter and the unit C4 of the smallest. Although four such coil units have been shown for illustrative purposes, greater or lesser number of the units may be used, depending upon the heating capacity desired. Each of the coil units C1, C2, C3, C4 is made up of a plurality of individual coils which have an overlapping helical lead so that all the individual coils in each unit are interfitted in vertically coplanar relation. As for example, taking the coil unit C1, it is made up of six individual coils C1a, C1b, C1c, C1d, C1e, C1f, the helical pitch of each coil, as for example the coil C1a, being such as to accommodate the other coils C1b, C1c, C1d, C1e, C1f, between the convolutions of the coil C1a. As another example, the coil unit C4 is shown as being made up of four individual coils C4a, C4b, C4c, C4d, with a similar interfitted or overlapping helical lead. For illustrative purposes the coil units C1 and C2 have been shown as consisting of six individual coils each and the units C3 and C4 as consisting of four individual coils each, but as a practical matter, a greater or lesser number of individual coils may be employed in a coil unit, depending upon the heating capacity desired, the diameter of the coil unit and the diameter of the tubes making up the coil units. However, it will be noted that the coils in the several units are wound in opposite directions, as for example, the coil unit C1 may be wound clockwise, the coil unit C2 counterclockwise, the coil unit C3 clockwise, the coil unit C4 counterclockwise, et cetera. Also, it is significant to note that the overall length of tubing in each individual coil of each coil unit is the same, regardless of the coil diameter. As a result, the center-to-center distance between adjacent convolutions of the coils in the largest coil unit C1 is somewhat greater than that in the next smaller coil unit C2, as is diagrammatically shown at 80, 81, respectively, in FIG. 5, the units C1 and C2 both containing six individual coils each. In the next smaller coil unit, C3, which has only four individual coils, the corresponding distance 82 may be greater than the distance 80, but in any event it is greater than the distance 83 between adjacent convolutions of the smallest coil unit C4 which also contains four individual coils. The distances 81, 83 are approximately the same. As between the coil units themselves, the transverse or radial spacing indicated at 84 is uniform.

As will be apparent from FIGS. 1 and 3, the end portions of all the individual coils in all the coil units are extended as at 85 for connection to the aforementioned tube plates or sheets 28, 30 at the top and bottom of the heat exchanger tank 16, the terminal ends of the coils being secured in the tube sheets in any suitable manner, as for example, by rolling, swaging, soldering, brazing, or the like. It is to be noted that inasmuch as the coil units C1, C2, C3, C4 are wound alternately in opposite directions, and inasmuch as all the individual coils are of the same length, their expansion and contraction in heating and cooling will produce mutually counteracting moments of torque on the tube sheets 28, 30 so that the tube sheets will not become turned or twisted in an axial direction and will always be in proper position for alignment with the mounting bolts 29, 31.

This torque neutralizing feature is brought out even more fully in the modified coil arrangement shown in FIGS. 6–9, wherein the end portions 86 of the coils in the coil bank or unit C1 are located on a circle of the same diameter as the end portions 87 of the coils in the next inner coil unit C2, while the coil end portions 88 of the coil unit C3 are on a circle of the same diameter as the coil end portion 89 of the coil unit C4. Instead of all the coil end portions being secured in a common tube sheet, the end portions 86, 87 of the coil units C1, C2 are fastened in a ring 90, while the end portions 88, 89 of the coil units C3, C4 are similarly fastened in a ring 91 disposed concentrically within the ring 90. The two coil mounting rings 90, 91 are removably attached to the tube sheets, as for example to the upper tube sheet 28' by a plurality of studs 92, a suitable gasket 93 being interposed between the rings and the tube sheet, as shown. Also, the tube sheets are provided with apertures 94 through which the open ends of the coil tubes may communicate with the steam header 22 and condensate header 33.

Center tubular supporting post 39, sockets 40, 41 are dispensed with when using the herein described modified coil arrangement.

It will be apparent that since the coil units C1, C2 are wound in opposite directions, they will counteract each other and thereby neutralize the torque incident to their expansion or contraction so that their common supporting ring 90 will not be subjected to any turning or axial twisting. The same also applies to the coil units C3, C4 which are connected to the common supporting ring 91.

After removal of coil assembly 27 of the modified unit, it is significant to note that coil units C1, C2 with their common mounting ring 90 may be removed from the coil assembly 27 by unscrewing studs 92, removing tube sheet 28', unscrewing studs holding ring 90' to opposite tube sheet 30', then removing coils C1, C2 leaving coils C3 and C4 attached to tube sheet 30'. In like manner any individual pair of similarly related coil units may be removed from the coil assembly regardless of the number of coil units in the assembly. This feature enables replacement or removal for repair of any pair of coil units attached to common tube sheet rings. This feature further provides access to every individual tube in the assembly for inspection, replacement or repair since each tube sheet ring accommodates only two coil units, the tubes in the outer coil ring unit being accessible from the outside of the coil ring unit, and the tubes in the inner coil ring unit being accessible from the inside of the coil ring unit.

The same advantages of the heat exchanger component of the unit as enumerated herein and applying primarily to water heaters will apply to other applications of heat exchangers including refrigeration and air conditioning systems, steam generators and chemical processing systems.

While in the foregoing there have been described and shown the preferred embodiments of the invention, various modifications and equivalents may become apparent to those skilled in the art to which the invention relates. Accordingly, it is not desired to limit the invention to this disclosure, and various modifications and equivalents may be resorted to, lying within the spirit and scope of the invention as claimed.

I claim:

1. In a heat exchanger, the combination of an elongated casing provided adjacent its opposite ends with an inlet and an outlet for a liquid to be heated, a pair of headers for a heating medium removably mounted at the opposite ends of said casing, a heat exchange coil assembly disposed in the casing and comprising pairs of coil units nested together in concentric relation, the coils in each pair being wound in relatively opposite directions and having free ends located on a common circle, pairs of concentric tube rings provided at the ends of said coil assembly and having the free ends of the respective coil units secured therein, the rings at the opposite ends of said coil assembly being juxtaposed to the respective headers and said headers being apertured whereby the ends of the coils in said rings may communicate with the interior of the headers, and means removably and independently attaching said rings to the headers, whereby each pair of coil units with its rings may be removed from said casing upon removal of said attaching means and of at least one of the headers.

2. The device as defined in claim 1 wherein each of said coil units comprises a plurality of individual coils with overlapping leads.

3. A heat exchanger comprising in combination, a tank having a cylindrical side wall provided adjacent its opposite ends with an inlet and an outlet for a liquid to be heated, a first header for a heating medium removably mounted at one end of said side wall, a second header for a heating medium secured to the other end of said side wall, a heat exchange coil assembly disposed in said tank, said coil assembly comprising pairs of coil units nested together in concentric relation, the coils in each pair being wound in relatively opposite directions and having free ends located on a common circle, and pairs of concentric tube rings provided at the ends of said coil assembly, said rings having the free ends of the respective pairs of coil units secured therein, and means removably and independently attaching said rings to said headers, whereby each pair of coil units with its rings may be removed from said tank independently of the other pairs of coil units upon removal of said attaching means and of said first header.

4. The device as defined in claim 3 wherein each of said coil units comprises a plurality of individual coils with overlapping leads.

5. The device as defined in claim 4 wherein all the coils in all the coil units are formed from equal lengths of tubing.

6. In a heat exchanger, the combination of a cylindrical tank, tube sheets attached to the ends of said tank, a coil assembly housed in said tank and supported by said tube sheets, said coil assembly comprising a plurality of helically wound coil units each formed by helically wound tubes, each tube in a coil unit forming a helix of the same pitch and diameter, the tubes in a coil unit being parallel and equally spaced and terminating at equally angularly spaced intervals at the ends thereof, alternate coil units in the coil assembly having helix windings in opposite directions and the number of tubes in odd coil units being the same as in even coil units, the even coil units having a smaller diameter than the odd coil units, the tube sheet rings attached to said tube sheets, tube ends of each even and odd coil units terminating and being secured in openings formed in said tube sheet rings, each ring having an inside diameter smaller than that of the next larger ring, said openings in each ring being on a center line with a radius of approximately midway between the center lines of two communicating coil units whereby ends of tubes of two coil units secured to a ring terminate on a center line of the same radius, removable stud bolts securing said rings to said tube sheets, said tube sheets having apertures in register with and larger than said openings in said rings, said coil units being spaced concentrically around the axis of said cylindrical tank with approximately equal spacing between the centers of the tubes in the coil units, all tubes in the coil assembly having the same length and the same inside and outside diameter; whereby to substantially neutralize torque created by each coil unit incident to expansion and contraction of tubes in the respective coil units.

7. A heat exchanger comprising in combination, a tank having a cylindrical side wall provided adjacent its opposite ends with an inlet and an outlet for a liquid to be heated, a first header for a heating medium removably mounted at one end of said side wall, a second header for a heating medium secured to the other end of said side wall, a heat exchange coil assembly disposed in said tank, said coil assembly comprising pairs of coil units nested in concentric relation, the coils in each pair having free ends located on a common circle, and pairs of concentric tube rings provided at the ends of said coil assembly, said rings having the free ends of the respective pairs of coil units secured therein, and means removably and independently attaching said rings to said headers, whereby each pair of coil units with its rings may be removed from said tank independently of the other pairs of coil units upon removal of said attaching means and of said first header.

8. The device as defined in claim 7 wherein each of said coil units comprises a plurality of individual coils with overlapping leads.

9. In a heat exchanger, the combination of an elongated casing provided adjacent its opposite ends with an inlet and an outlet for a liquid to be heated, a pair of headers for a heating medium removably mounted at the opposite ends of said casing, a heat exchange coil assembly disposed in the casing and comprising pairs of coil units nested together in concentric relation, the coils in each pair having free ends located on a common circle, pairs of concentric tube rings provided at the ends of said coil assembly and having the free ends of the respective coil units secured therein, the rings at the opposite ends of said coil assembly being juxtaposed to the respective headers and said headers being apertured whereby the ends of the coils in said rings may communicate with the interior of the headers, and means removably and independently attaching said rings to the headers, whereby each pair of coil units with its rings may be removed from said casing upon removal of said attaching means and of at least one of the headers.

10. The device as defined in claim 9 wherein each of said coil units comprises a plurality of individual coils with overlapping leads.

11. In a heat exchanger, the combination of a cylindrical tank provided adjacent its opposite ends with an inlet and an outlet for a liquid to be heated, a pair of tube sheets provided at the opposite ends of said tank, at least one of said tube sheets being removable, a heat exchange coil assembly disposed in the tank and comprising a plurality of coil units nested together in concentric relation, a plurality of pairs of tube rings having the ends of the respective coil units secured therein, and means removably and individually attaching said rings to said tube sheets, whereby each coil unit with its rings may be removed from the tank independently of the other coil units.

12. The device as defined in claim 11 wherein each of said coil units comprises a plurality of individual coils with overlapping leads.

13. The device as defined in claim 11 together with a header for a heating medium removably mounted at one end of said tank, said removable tube sheet being clamped between said one end of the tank and said header.

References Cited

UNITED STATES PATENTS

| | | | |
|---|---|---|---|
| 1,768,222 | 6/1930 | Uhde | 165—163 |
| 2,081,043 | 5/1937 | Kuhni | 165—163 |
| 2,196,683 | 4/1940 | Pickstone | 165—162 X |
| 2,349,143 | 5/1944 | Chute et al. | 165—143 X |
| 3,228,463 | 1/1966 | Kagi | 165—158 |

FOREIGN PATENTS

| | | |
|---|---|---|
| 199,210 | 6/1923 | Great Britain. |

MEYER PERLIN, *Primary Examiner.*

ROBERT A. O'LEARY, *Examiner.*

N. R. WILSON, T. W. STREULE, *Assistant Examiners.*